US007693590B2

(12) United States Patent
Nelson

(10) Patent No.: US 7,693,590 B2
(45) Date of Patent: Apr. 6, 2010

(54) SYSTEMS AND METHODS FOR NOTIFYING OF PERSISTENT STATES OF MONITORED SYSTEMS USING DISTRIBUTED MONITORING DEVICES

(75) Inventor: Mark Nelson, Lindon, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 358 days.

(21) Appl. No.: 11/314,806

(22) Filed: Dec. 21, 2005

(65) Prior Publication Data

US 2007/0142927 A1 Jun. 21, 2007

(51) Int. Cl.
*G06F 19/00* (2006.01)

(52) U.S. Cl. ........................................ 700/80; 709/206

(58) Field of Classification Search .................. 700/11, 700/80, 114–117; 709/206, 219, 202, 229; 455/567; 705/412

See application file for complete search history.

(56) References Cited

U.S. PATENT DOCUMENTS 6,084,521 A 7/2000 Ha
6,105,148 A * 8/2000 Chung et al. .................. 714/16
6,542,076 B1 * 4/2003 Joao ...................... 340/539.14
6,574,630 B1 * 6/2003 Augustine et al. ............. 707/10
6,763,384 B1 * 7/2004 Gupta et al. ................ 709/224
6,993,363 B1 1/2006 Hsu
6,999,992 B1 * 2/2006 Deen et al. .................. 709/206
2003/0023975 A1 * 1/2003 Schrader et al. ............... 725/51
2006/0103520 A1 * 5/2006 Clark ......................... 340/506
2008/0062000 A1 * 3/2008 Styers et al. ............. 340/686.1
2008/0106597 A1 * 5/2008 Amini et al. ................ 348/143

FOREIGN PATENT DOCUMENTS

WO 01/75835 10/2001

* cited by examiner

*Primary Examiner*—Kidest Bahta
(74) *Attorney, Agent, or Firm*—Austin Rapp & Hardman

(57) ABSTRACT

A system and method for providing notification when a state of a monitored system persists for a specified period of time utilizing distributed monitoring devices is disclosed. It is first detected, utilizing a monitoring device, that a monitored system is in a specified state. A timer within the monitoring device is initiated in response to detecting that the monitored system is in the specified state. The monitored system is monitored, utilizing the monitoring device, to determine whether the monitored system remains in the specified state. If the monitored system remains in the specified state for a specified period of time, notification is transmitted from the monitoring device to a client device via a network.

18 Claims, 11 Drawing Sheets

SYSTEMS AND METHODS FOR NOTIFYING OF PERSISTENT STATES OF MONITORED SYSTEMS USING DISTRIBUTED MONITORING DEVICES

TECHNICAL FIELD

The present invention relates generally to computers and computer-related technology. More specifically, the present invention relates to systems and methods for notifying of persistent states of monitored systems utilizing distributed monitoring devices.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional, complete computer system. For example, these small computers may be a one-chip computer, such as a microcontroller, a one-board type of computer, such as a controller, or a typical desktop computer, such as an IBM-PC compatible, etc.

Computers typically have one or more processors at the heart of the computer. The processor(s) are usually interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor (s).

Embedded systems may be utilized in a wide variety of different scenarios. For example, lighting systems may utilize embedded technology. In particular, an embedded system may be used to monitor and control a lighting system. For example, an embedded system could be used to dim or increase the brightness of an individual light or a set of lights within a lighting system. An embedded system may be used to create a specific lighting pattern by activating individual lights within the lighting system. Embedded systems may be coupled to individual switches within the lighting system. An embedded system may instruct the switches to power up or power down individual lights or the entire lighting system. The brightness or power state of each individual light may thus be controlled by the embedded system.

Security systems may likewise utilize embedded technology. An embedded system may be used to control and monitor the individual security sensors within a security system. An embedded system may provide controls to power up each of the security sensors automatically at a specific time of day or night. An embedded system may be coupled to a motion sensor. An embedded system may power up the individual motion sensor automatically and provide controls to activate a video camera and activate an alarm, if motion is detected. Embedded systems may also be coupled to sensors monitoring a door or a window and take specified action when activity is sensed.

Embedded technology may also be used to control wireless products, such as cell phones. An embedded system may provide instructions to power up the display of the cell phone. An embedded system may also activate the audio speakers within the cell phone to provide the user with an audio notification of an incoming call.

Home appliances, such as stoves, refrigerators, or microwave ovens, may also incorporate embedded technology. For example, a massage recliner may incorporate an embedded system to provide instructions to automatically recline the back portion of the chair according to the preferences of the user. An embedded system may also provide instructions to initiate the oscillating components within the chair according to the preferences of the user.

Additional products typically found in homes may also incorporate embedded systems. For example, an embedded system may be used within a toilet to control the level of water used to refill the water supply tank. Embedded systems may be used within a jetted bathtub to, for example, control the outflow of air.

Computer systems and embedded systems have additionally been utilized to monitor remote devices. Unfortunately, monitoring these devices using centralized systems can create significant problems if network communication is interrupted or terminated. For example, if a central server is tracking the state of a remote device and network access is interrupted, the remote device may change states during interruption. When the network connection is restored, the centralized system incorrectly believed that the remote device remained in the same state during interruption, potentially determining that a problem exists. For instance, if a centralized system is monitoring whether a door is open or closed for a long period of time, and the door is opened followed by interruption of network communications, the centralized system may incorrectly determine that the door remained open during the entire period of interrupted network conductivity. This incorrect determination could trigger false alarms and the like. The remote device may also incorrectly determine the current state of the device because of the interruption. Furthermore, significant network bandwidth may be required to monitor the states of a remote device using a network.

Accordingly, benefits may be realized by improved systems and methods for identifying persistent states of remote devices. Some exemplary systems and methods for tracking persistent states of remote devices are disclosed.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
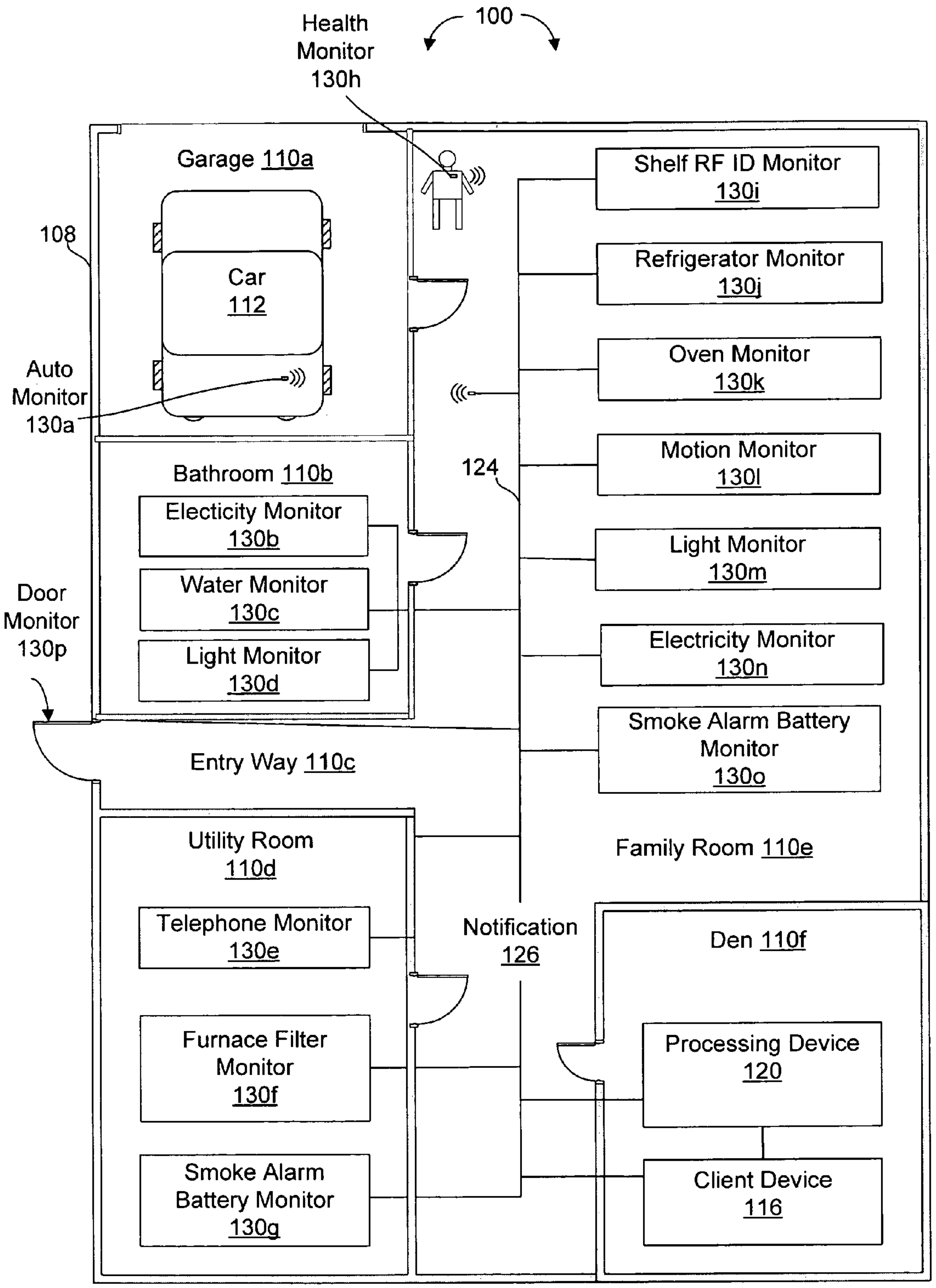
FIG. 1 is a block diagram of one embodiment of a persistent state notification system shown within a home.

A method for providing notification when a state of a monitored system persists for a specified period of time is disclosed. It is first detected, utilizing a monitoring device, that a monitored system is in a specified state. A timer within the monitoring device is initiated in response to detecting that the monitored system is in the specified state. The monitored system is monitored, utilizing the monitoring device, to determine whether the monitored system remains in the specified state. If the monitored system remains in the specified state for a specified period of time, notification is transmitted from the monitoring device to a client device via a network. If, after initiating the timer, the monitored system changes to a state other than the specified state before the specified period of time passes, the timer may be reset.

In one embodiment, the monitoring device comprises an embedded device. The monitored system and the monitoring device comprise an integrated device.

In addition, the specified state may require that more than one criterion be satisfied. One embodiment of the disclosed method may further comprise receiving parameters at the monitored device to define the specified state of the monitored system and the specified period of time.

One configuration may require processing the notification by a processing device before the notification is transmitted to the client device. In such a case, the disclosed method may further comprise processing a second notification by the processing device, wherein the second notification was transmitted to the processing device by a second monitoring device. In addition, such a method may further comprise transmitting a second notification from the processing device to a second client device in response to receipt of parameters from the second client device, wherein the second notification was transmitted to the processing device by the monitoring device. This method may further comprise processing the notification at the processing device and transmitting the notification to a second client device.

A computer system configured to implement the methods described above is also disclosed. The system includes a monitoring device having a processor and memory electronic communication with each other. Instructions are stored in the memory to implement the methods described above. A computer-readable medium, independent of the system described above, comprising executable instructions for implementing the methods described above is also disclosed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the term "computing device" refers to any type of electronic device having a processor, which typically performs arithmetic or logical operations. The computing device may include memory (e.g., random access memory (RAM), flash memory, and/or a hard disk storage device). The computing device may process instructions stored in memory. A computing device may optionally include other components, such as communication interfaces (e.g., a network card or modem) for communicating with other devices, inputs for receiving user input (e.g., a keyboard, touchpad, or mouse) or outputs (e.g., audio outputs or a display screen) for providing information to a user. Additionally, it should be noted that a computing device may be embodied as different types of devices, such as a desktop computer, server, tablet PC, notebook computer, personal data assistant (PDA), cellular phone, or embedded device.

FIG. 1 is a block diagram of one embodiment of a persistent state notification system 100 shown within a home 108. The depicted home 108 includes a garage 110*a* housing a car 112, a bathroom 110*b*, an entryway 110*c*, a utility room 110*d*, a family room 110*e*, and a den 110*f*. The diagram of FIG. 1 depicts the first floor of the home 108. For simplicity, the second floor is not shown.

The home 108 illustrated in FIG. 1 is, of course, only exemplary. The persistent state notification system 100 may be utilized in various environments, such as an office building, an apartment complex, a neighborhood, or a city.

The illustrated monitoring system 100 includes a client device 116, a processing device 120, a network 124, and a series of monitoring devices 130. The client device 116 is a computing device that may be utilized to create and/or transmit parameters that define when notifications 126 are generated by the monitoring devices 130. The client device 116 may also be used to receive, route, and/or process notifications 126 generated by the monitoring devices 130, although this is not always the case. Accordingly, the client device 116 may be embodied in various ways, such as an embedded device, laptop computer, desktop computer system, cellular phone, personal digital assistant (PDA), or dumb terminal.

The processing device 120 is a computing device that may be utilized to process, receive, and/or route parameters that control when notifications 126 are generated by the monitoring devices 130. The processing device 120 may also be used to process, receive, and/or route notifications 126 generated by monitoring devices 130. In one embodiment, the processing device 120 may also be utilized to create, process, transmit, and/or route data signals to control devices coupled to the network 124. Within the scope of the systems and methods disclosed herein, one processing device may be utilized to process notifications 126 and parameters related to the monitoring devices 130, and a separate processing device may be used to process control signals for controlling devices coupled to the network 124. Further, as will be explained below, in various embodiments, a processing device 120 is not utilized or necessary. In addition, it should also be noted that the client device 116 and the processing device 120 may be integrated into a single computing device.

The network 124 is a communication channel through which data signals may be transmitted between, for example, the client device 116, the processing device 120, and monitoring devices 130. The network 124 may be embodied in various ways. For example, the network 124 may include local area networks (LANs), storage area networks (SANs), metropolitan area networks (MANs), wide area networks (WANs), or combinations thereof (e.g., the Internet) with no requirement that the processing device 120 and client device 116 reside at the same physical location, within the same network 124 segment, or even within the same network 124. A variety of different network 124 configurations and protocols may be used, including Ethernet, TCP/IP, UDP/IP, IEEE 802.11, IEEE 802.16, Bluetooth, asynchronous transfer mode (ATM), fiber distributed data interface (FDDI), token ring, wireless networks (e.g., 802.11g), proprietary formulas, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network." The network 124 may also comprise, in one embodiment, an embedded device network produced by Matsushita Electric Works, Ltd. of Osaka, Japan. An embedded device network comprises distributed networks of requesters, providers, and intervening nodes that allow rapid re-routing of communication channels when network 124 failures occur.

The monitoring devices 130 may be embodied in a wide variety of different configurations. For example, the monitoring device 130 may be an embedded device integrated with or physically separate from the system to be monitored (i.e., a monitored system). Exemplary types of monitoring devices 130 include an auto monitor 130*a*, electricity monitor 130*b*, 130*n*, water monitor 130*c*, light monitor 130*d*, 130*m*, telephone monitor 130*e*, furnace filter monitor 130*f*, smoke alarm battery monitor 130*g*, 130*o*, health monitor 130*h*, shelf radio frequency identification (RF ID) monitor 130*i*, refrigerator monitor 130*j*, oven monitor 130*k*, motion monitor 130*l*, and door monitor 103*p*.

The monitoring devices 130 disclosed herein do not transmit notification 126 of a particular state until a specified period of time has passed. For example, the auto monitor 130*a* could transmit a notification 126 to a client device 116 when an air filter has been in the car 112 for six months and hence needs to be changed. The health monitor 130*h* could transmit a warning if the monitored person's heart rate exceeds or goes below a set threshold for a specified period of time.

The electricity monitor 130*b*, 130*n* may transmit a notification 126 when electricity is being consumed at a high rate (above a certain threshold) for more than, for example, ten minutes. Such a state or criterion could indicate that a hair dryer has inadvertently been left on. In a similar manner, a water monitor 130*c* or a light monitor 130*d*, 130*m* could transmit a notification 126 if the water or a light has been left on for more than a specified period of time, such as ten minutes.

The telephone monitor 130*e* may provide notification when, for example, voice messages have not been retrieved for a period of, for example, two hours. The furnace filter monitor 130*f* may likewise indicate when the furnace filter has not been changed for two months. In a similar manner, the smoke alarm battery monitor 130*g*, 130*o* may transmit a notification 126 when the same battery has been present in the identified alarm for six months.

The shelf RF ID monitor 130*i* may be triggered when, for example, a box of cereal, having an RF ID tag, has been on a shelf or in the pantry for six months without being removed. The refrigerator monitor 130*j* may be triggered in various cases, such as when the refrigerator door is left open for more than five minutes. Utilizing RF ID technology or a similar item identification technology, the refrigerator monitor 130*j* could trigger a notification 126 when milk has been in the refrigerator for more than a week. The oven monitor 130*k* may indicate if the oven has been on for a certain period of time (e.g., one hour) with nothing in it. The door monitor 130*p* may indicate when the door has been open or unlocked for a specified period of time.

The motion monitor 130*l* may be utilized in connection with other monitors 130. For instance, if the electricity monitor 130*b*, 130*n* indicates that electricity is being consumed at a high rate for a specified period of time, but the motion monitor 130*l* indicates that no one has been in the monitored region for a specified period of time, a notification 126 may be triggered. A similar procedure may be followed utilizing the motion monitor 130*l* and the light monitor 130*d*, 130*m*, i.e., a notification 126 will be transmitted if the motion monitor 130*l* indicates that motion has not been detected for a specified period of time and the lights have been on for a specified period of time. As will be explained in further detail below, processing of these types of multiple criterion scenarios may be handled by the monitoring devices 130, the processing device 120, and/or the client device 116.

The embodiment illustrated in FIG. 1 is merely illustrative. While the depicted system 100 includes multiple monitoring devices 130 and only one processing device 120 and one client device 116, multiple processing devices 120 and client devices 116 may be utilized within the scope of the disclosed systems and methods. Furthermore, monitoring devices 130 may be utilized to monitor a wide variety of monitored systems, not merely those shown in FIG. 1.

Figure 2:
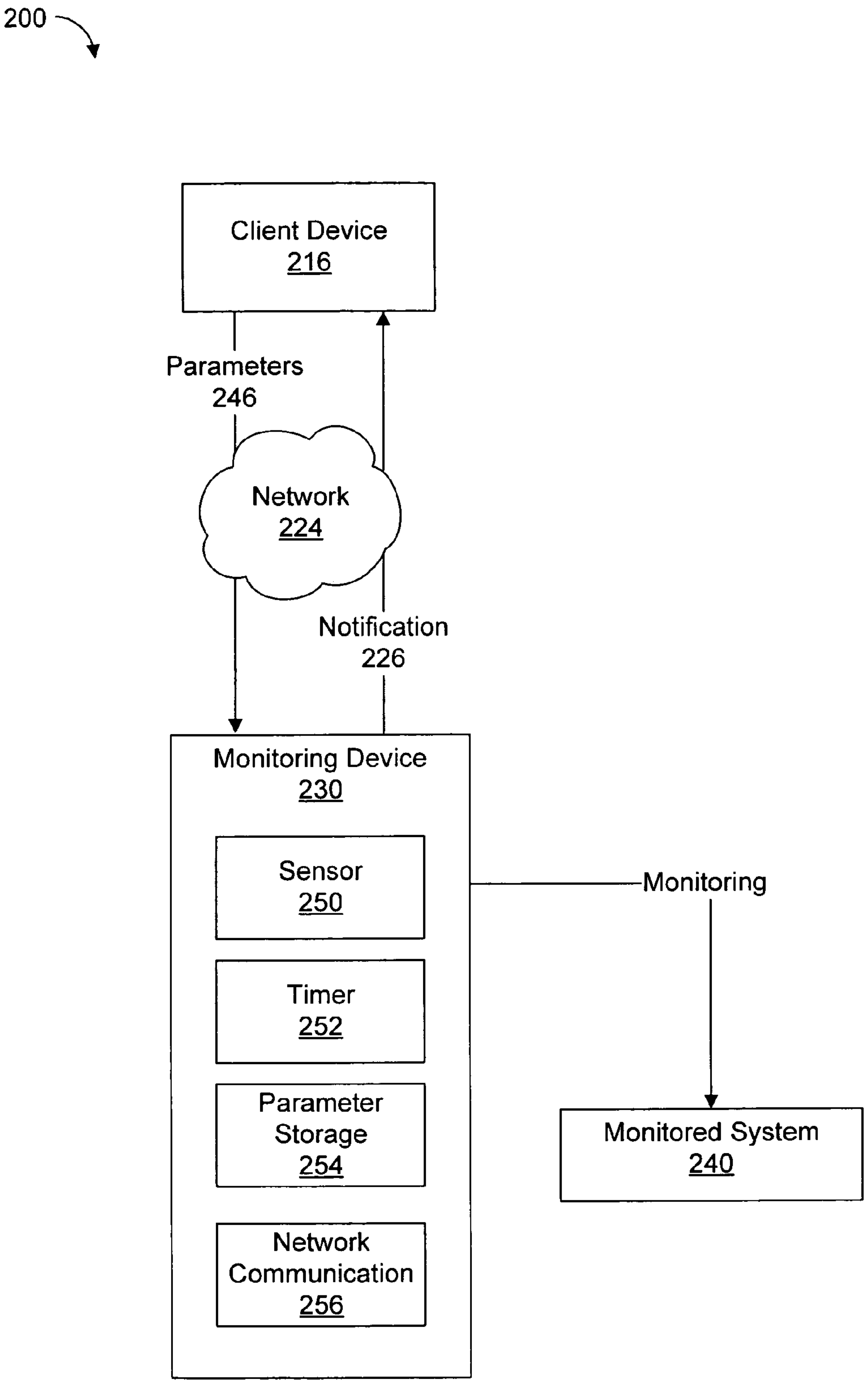
FIG. 2 is a block diagram showing an embodiment of a persistent state notification system that does not include a processing device.

FIG. 2 is a block diagram of one embodiment of a persistent state notification system 200. A client device 216, network 224, monitoring device 230, and monitored system 240 are depicted. In the depicted embodiment, a processing device 120, as shown in FIG. 1, is not utilized.

As indicated in connection with FIG. 1, the client device 216 is a computing device that may receive, process, and route notifications 226 generated by the monitoring system 200. As also indicated above, the network 224, which enables communication between the client device 216 and the monitoring device 230, may be embodied in various ways. The client device 216 may also be utilized to transmit parameters 246 for the notification 226 to the monitoring device 230.

In one embodiment, the device that transmits the parameters 246 does not necessarily receive the notifications 226. However, in the scenario illustrated in FIG. 2, the client device 216 both transmits the parameters 246 and receives the notifications 226.

A monitoring device 230 is also depicted in FIG. 2. In one embodiment, the monitoring device 230 is a simple embedded device. Of course, the monitoring device 230 may be embodied in other ways that include more complex computational power and components, even if it is embodied as an embedded device.

The depicted monitoring device 230 includes a sensor 250, timer 252, parameter storage component 254, and network communications component 224. The sensor 250 includes, for example, an electrical sensor 250 (e.g., a sensor that determines the voltage of electricity present in a monitored line), optical sensor (e.g., a motion sensor), tactile sensor (e.g., a human pulse monitor), and/or chemical sensor (e.g., to determine the chemical components of an analyzed substance). The timer 252 determines when the monitored system 240 has been in the specified state for the specified period of time (specified by the parameters 246). The parameter storage component 254 is utilized to store the parameters 246 generated by the client device 216. Again, the parameters 246 may include a specified state of the monitored system 240, a specified period of time, and/or other items. The network communications component 256 enables the monitoring device 230 to receive and transmit data from other devices. The foregoing components 250, 252, 254, 256 are only exemplary. In certain embodiments, one or more of these components 250, 252, 254, 256 may be omitted or other components may be included.

The monitored system 240 may comprise anything that would be of interest to monitor. For example, this could include the heart rate or blood sugar level of an individual, the presence of motion in the room, the presence of items with RF ID tags on a shelf, the time a filter has been in a furnace, the time a battery has been in a smoke detector, or the time that a product has been on a shelf or in a refrigerator.

In the illustrated system, a client device 216 has specified the parameters 246 upon which notification 226 will be provided. In one embodiment, these parameters 246 include the specified state of the monitored system 240 (e.g., the refrigerator door is open) and/or the specified period of time that the monitored system 240 must be in the specified state before notification 226 is transmitted. The parameters 246 could also include, for example, where notification 226 should be sent. In one embodiment, the specified state does not need to be included in the parameters because the device 230 permits only one possible state to be monitored. For example, with respect to a particular motion monitor, in one embodiment, the only monitorable state could be the "no motion detected" state or alternatively the "motion detected" state.

Following receipt of the parameters 246, the sensor 250 monitors the monitored system 240 based on the parameters 246. When the monitored system 240 is in the specified state, the timer 252 is initiated. If the monitored system 240 remains in the specified state for the specified period of time, the monitoring device 230 will transmit notification 226 to the client device 216 utilizing the network communication component 224. If the monitored system 240 changes to a state other than the specified state before the specified period of time is reached, the timer 252 will be reset to zero or null until the specified state is detected yet again.

The embodiment shown in FIG. 2 is merely exemplary. For example, within the scope of the systems and methods disclosed herein, an embodiment of a persistent state notification system 200 may include many client devices 216, a variety of different networks 224, and many different types of monitoring devices 230 and monitored systems 240.

Figure 3:
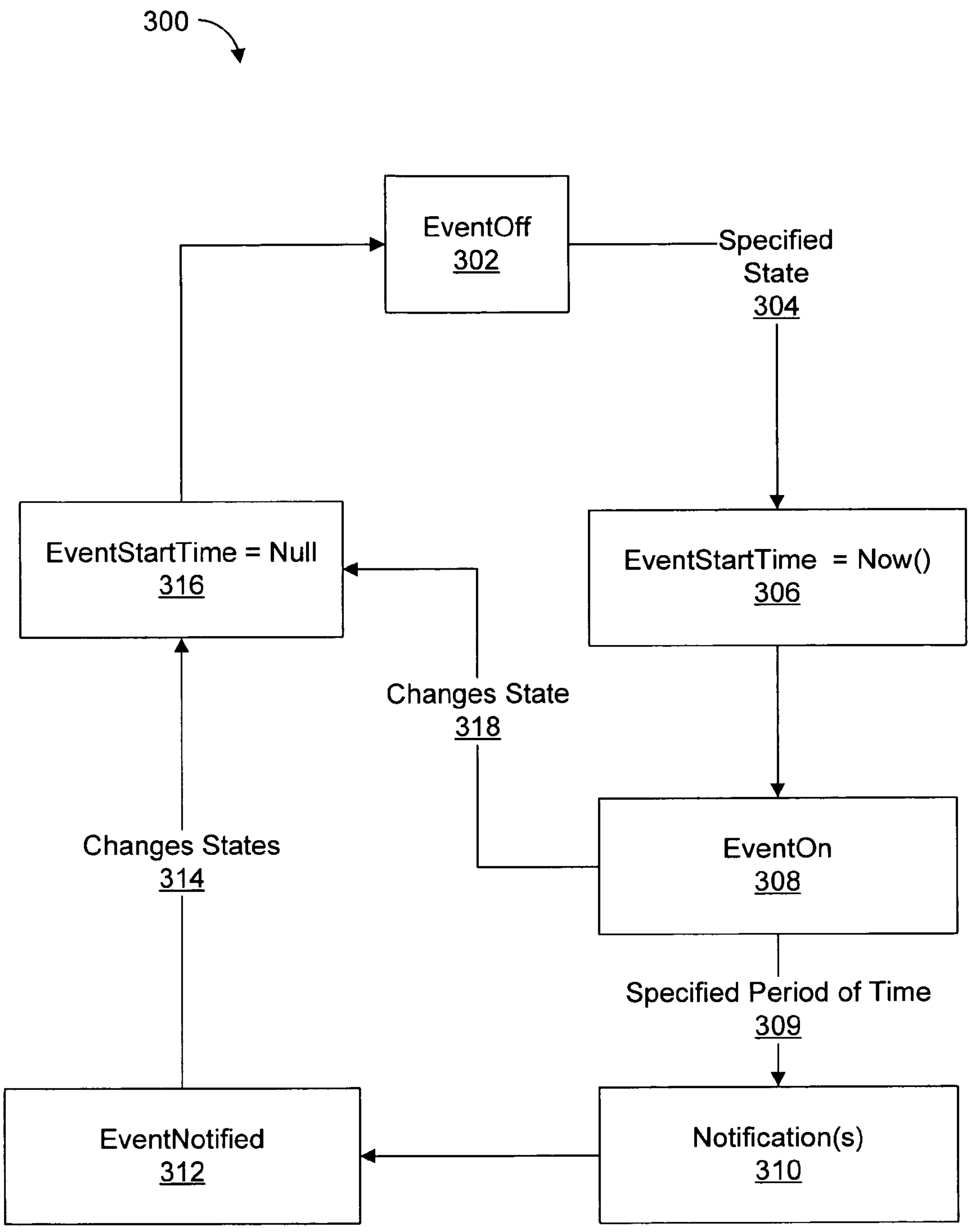
FIG. 3 is a flow diagram illustrating one embodiment of the operation, or states, of a monitoring device.

FIG. 3 is a flow diagram 300 illustrating one embodiment of the operation, or states, of a monitoring device. The initial state is the "EventOff" state 302. This is the state 302 of the monitoring device when the specified state of a monitored system has not yet been detected. When the monitored system is in the specified state 304, a variable (e.g., EventStartTime) that tracks the starting time of the specified state is set 306 to the current time.

During the "EventOn" state 308, monitoring of the monitored system continues. If the monitored system remains in the specified state for the specified period of time 309, notification is transmitted 310 to the client device. If subsequent notifications are desired or requested, they are delivered until all requested/configured notifications have been transmitted 310. The system then moves to the "EventNotified" state 312. The monitoring device remains in this state 312 until the state of the monitored system changes 314 from the specified state. Thereafter, the variable (e.g., EventStartTime) is set 316 to null and the monitoring device moves to the "EventOff" state 302.

The "EventNotified" state 312 is utilized to avoid duplicate notifications if the specified state of the monitored system persists for another iteration of the specified period of time. In one embodiment, the "EventNotified" state 312 is omitted. Accordingly, in such an embodiment, if the specified state persists for another iteration of the specified period of time, another notification will be sent. In one embodiment, parameters may be used to control the frequency and type of subsequent notifications. This allows for an escalation or transformation of notification methods, for example, as might be used in a security system to initially sound a low alarm, followed by lights being turned on accompanied by a louder alarm, and followed by a call to a cell phone or to a security company.

If the monitored system changes 318 states during the "EventOn" state 308 (before the specified period of time expires), the variable (e.g., EventStartTime) is set 316 to null or otherwise reset. Again, the monitoring device will then move into the "EventOff" state 302.

The embodiment shown in FIG. 3 is merely illustrative. The states utilized within such a device may be configured in a number of different ways within the scope of the systems and methods disclosed herein.

Figure 4:
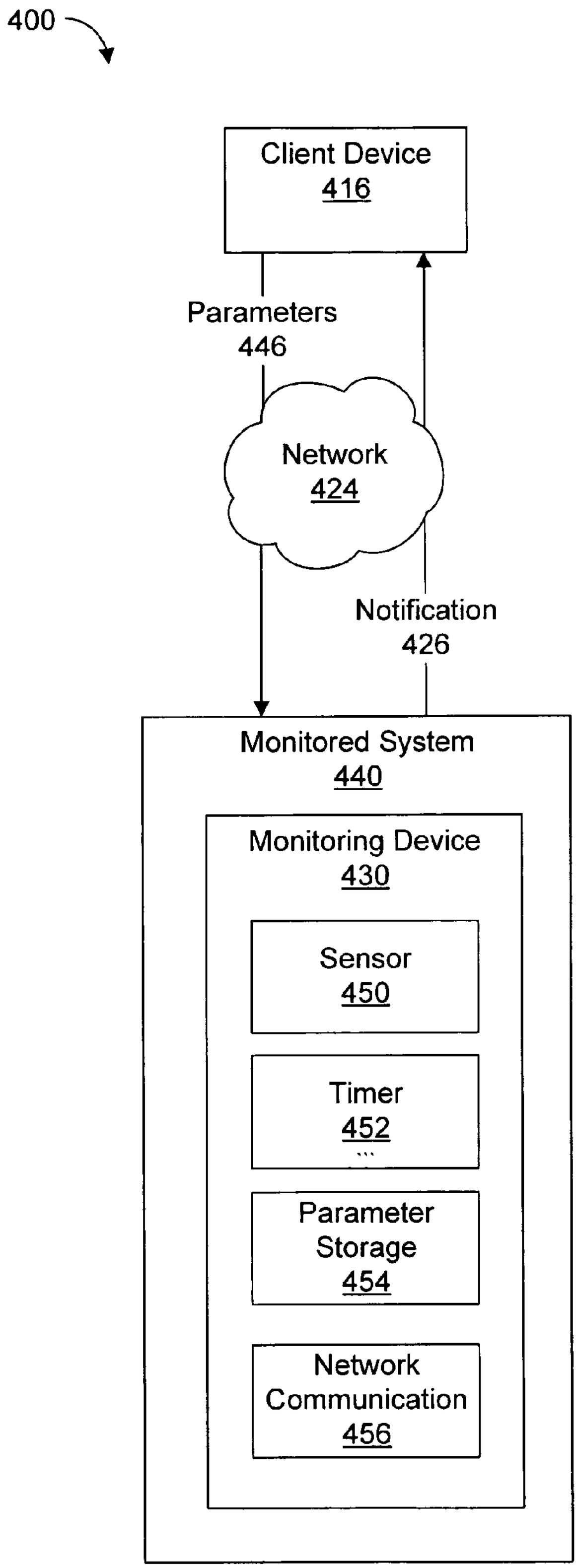
FIG. 4 illustrates an alternative embodiment of a persistent state notification system in which a monitoring device is integrated with a monitored system.

FIG. 4 illustrates an alternative embodiment of a persistent state notification system 400. This system 400 is similar to the system 200 shown in FIG. 2. Accordingly, the client device 416, network 424, monitoring device 430, and its components (the sensor 450, timer 452, parameter storage 454, and network communication components 456) function in much the same way as the embodiment shown in FIG. 2.

However, in this system 400, the monitoring device 430 is integrated with the monitored system 440. For example, an auto monitor 130*a* (shown in FIG. 1) may be integrated with the vehicle in which it is utilized. In fact, the auto monitor 130*a* may comprise a system of sensors 450 for different aspects of the vehicle 112, such as air filters, fuel filters, or similar items that may require maintenance or repair on a periodic basis. While a motion monitor 130*l* (shown in FIG. 1) can be integrated with the monitored system 440 (an area in which motion is detected), a light sensor 450 may be integrated with, for example, a light fixture or a light switch.

Accordingly, the embodiment disclosed in FIG. 4 functions in the following way. Parameters 446 are transmitted from the client device 416 to the monitoring device 430. The monitoring device 430 monitors the monitored system 440 in accordance with the parameters 446. When the monitored system remains in the specified state for the specified period of time, a notification 426 is transmitted to the client device 416 via the network 424.

The embodiment shown in FIG. 4 may be configured in a number of different ways within the scope of the disclosed systems and methods, including the use of multiple client devices 416, monitored systems 440, and/or monitoring devices 430.

Figure 5:
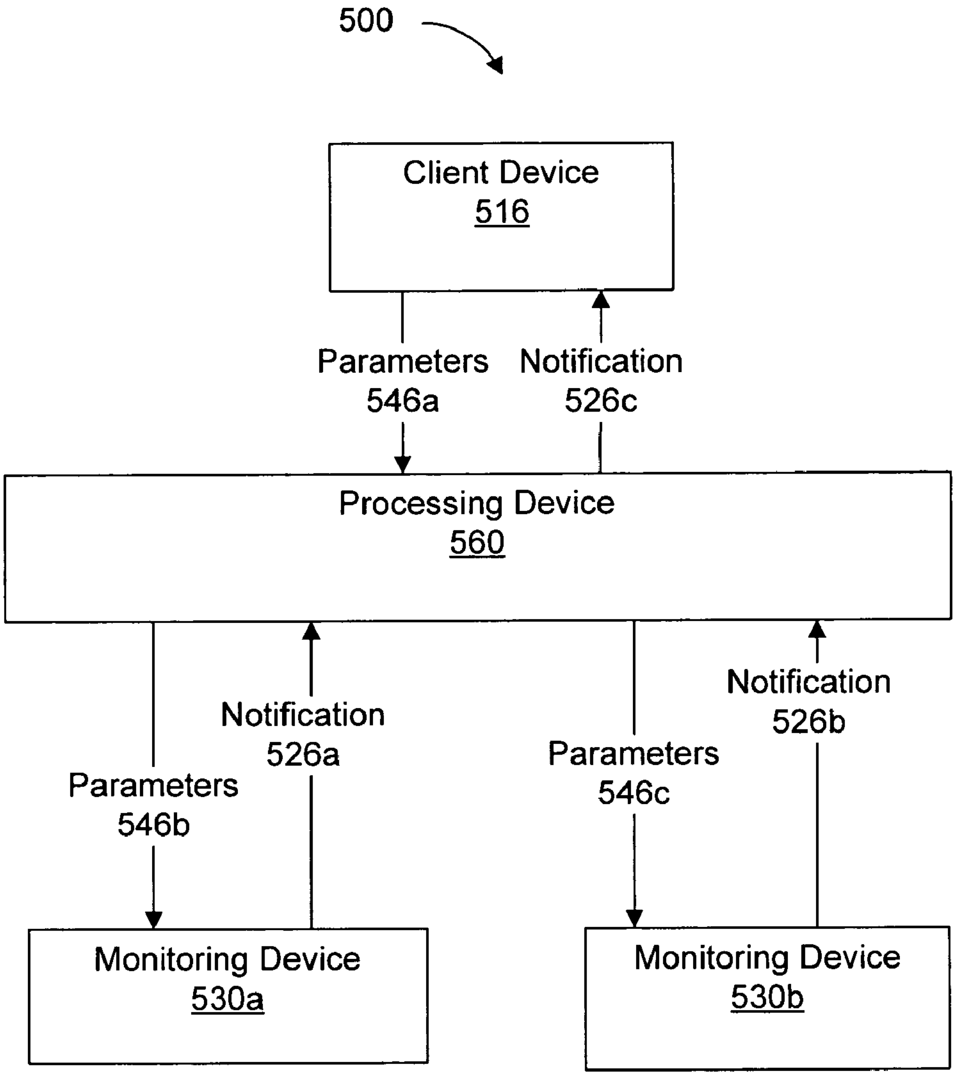
FIG. 5 is an alternative embodiment of a persistent state notification system including two monitoring devices and a processing device.

FIG. 5 is an alternative embodiment of a persistent state notification system 500. In the depicted embodiment, a client device 516, processing device 560, network, and monitoring devices 530 are utilized. For simplicity, the monitored systems, components of the monitoring devices 530, and network are not shown. The processing device 560, monitoring devices 530, and client device 516 are in electronic communication via the network or other communication channels (e.g., a universal serial bus (USB) cable, a fire wire cable, or a separate network). In one embodiment (not depicted), the client device 516 and processing device 560 could comprise an integrated computing device. The monitoring devices 530 may be in electronic communication with each other.

As with the embodiment depicted in FIG. 1, the processing device 560 may be utilized to process (e.g., filter and route) parameters 546 and notifications 526. In this embodiment, parameters 546*a* are transmitted to the processing device 560 which processes the parameters 546. The processing device 560 will optionally reformulate or parse the parameters 546*a* and then transmit the parameters 546*b-c* to the appropriate monitoring devices 530. Of course, in one embodiment, the parameters 546*a* could be transmitted via the network directly to a monitoring device 530.

Thereafter the monitoring devices 530 will commence monitoring the monitored systems. When the monitored systems remain in the specified state for the specified period of time, notifications 526*a-b* are transmitted to the processing device 560. (Again, in an alternative embodiment, notifications 526 may be transmitted directly to the client device 516.) Thereafter, the processing device 560 may process the received notifications 526*a-b*. In particular, the processing device 560 may filter and route notifications 526 to the appropriate client device 516.

The processing device 560 enables the use of multiple monitoring devices 530 (i.e., more than one criterion) to determine when a notification 526 will be sent to a particular client device 516. For example, a first criterion may require that the television be turned on for at least ten minutes. A second criterion may require that no motion be detected within the pertinent room for ten minutes. Accordingly, parameters 546*a* describing the first and second criterion are transmitted to the processing device 560. The processing device 560 then parses and retransmits parameters 546*b-c* to the pertinent television monitor 530*a* and to the pertinent motion monitor 530*b*. When these parameters 546 are satisfied, appropriate notifications 526 are transmitted to the processing device 560. The processing device 560 does not immediately pass on a first notification 526*a* it receives. Instead, the processing device 560 waits for notification 526*b* from the second device 530*b* to ensure that both criteria have been satisfied before transmitting notification 526*c* to the client device 516.

The processing device 560, in order to properly manage multiple criteria parameters 546, may require adaptation of the parameters 546*a* received. For instance, utilizing the example explained above, if a notification 526*a* indicating that the television has been on for ten minutes is received at the processing device 560 and no notification 526*b* of "no motion" for ten minutes has yet been received, no notification 526*c* will be transmitted to the client device 516. However, what happens if notification 526*b* of no motion is received five minutes later. Without adapting the parameters 546, the processing device 560 would not be able to determine whether the television is still on and could improperly send notification 526 to the client. However, the second set of parameters 546*b* could be adapted to include a request for a timer value to be included in the notification 526*a*. The timer value indicates how long the monitored television has been on. The timer associated with the timer value will continue to run past the ten-minute mark so long as the television is left on. When notification 526*b* of no motion for ten minutes is subsequently received from the second monitoring device 530*c*, the second set of parameters 546*b* (or a request specifically designed to obtain the timer value) could be sent again to the first monitoring device 530*a*. A timer value could be returned to the processing device 560 or, alternatively, if the television has been on for at least ten minutes a notification 526*a* (optionally including a timer value) could be sent to the processing device 560. Using the notification 526*a* and/or the a timer value, the processing device 560 can determine whether the television has been on for at least ten minutes and avoid sending improper notification 526*c* to the client device 516.

The system 500 disclosed in FIG. 5 may be implemented in a number of different ways. For example, in one embodiment, the foregoing procedures could be realized without a processing device 560, if the monitoring devices 530 and/or client device 516 comprise instructions for performing these procedures. Furthermore, many different client devices 516, processing devices 560, and/or monitoring devices 530 may be utilized within the scope of the disclosed systems and methods.

Figure 6:
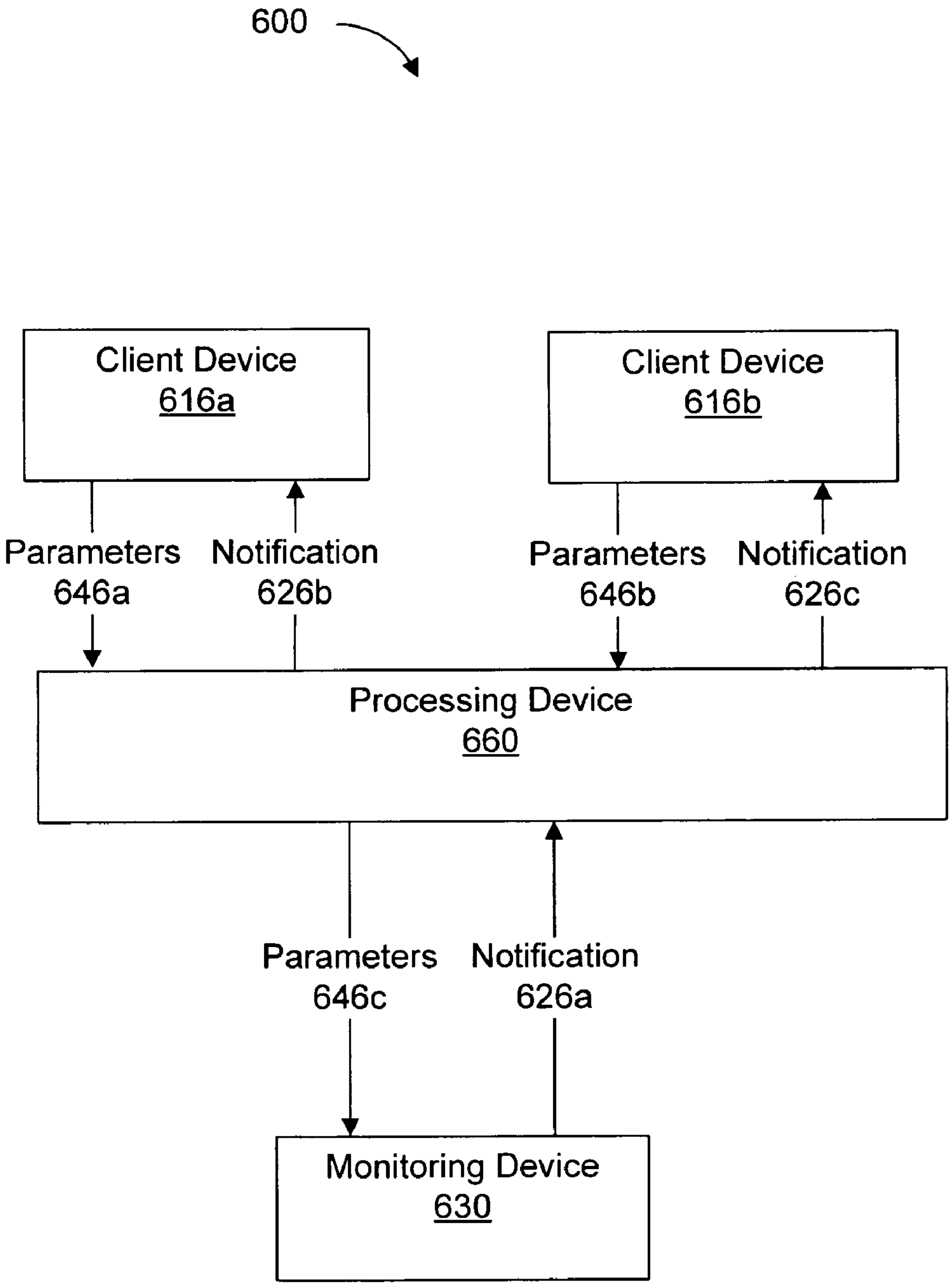
FIG. 6 is an alternative embodiment of a persistent state notification system including two client devices and a processing device.

FIG. 6 is an alternative embodiment of a persistent state notification system 600. In the depicted embodiment, two client devices 616*a-b*, a processing device 660, a network, and a monitoring device 630 are utilized. For simplicity, the monitored systems, components of the monitoring device 630, and network are not shown. The processing device 660, monitoring device 630, and client devices 616 are in electronic communication via the network or other communication channels. In one embodiment (not depicted), one of the client devices 616 and the processing device 660 could comprise an integrated computing device.

As with the embodiment depicted in FIG. 5, the processing device 660 may be utilized to process parameters 646 and notifications 626. In this embodiment, first and second parameters 646*a-b* are transmitted to the processing device 660 from each of the client devices 616*a-b*. Of course, in one embodiment, the parameters 646*a-b* could be transmitted via the network directly to the monitoring device 630.

At this point, the processing device 660 needs to determine how to reconcile the first and second parameters 646. For example, assume the first parameters 646*a* require notification 626 when the television has been on for 30 minutes and the second parameters 646*b* require notification 626 when the television has been on for 45 minutes. In this case, the processing device 660 would then identify the least common denominator (i.e., 15 minutes) and then transmit appropriate parameters 646*c* to the monitoring device 630. The parameters 646*c* transmitted to the monitoring device 630 would require notification 626 every 15 minutes. The first notification 626 received would be logged at the processing device 660 but no notification would be provided to client devices 616*a-b*. If a second notification 626 is received 15 minutes later from the monitoring device 630, then the notification 626*b* would be sent to the first client device 616*a*. If a third notification 626 is received 15 minutes later, notification 626*c* will be transmitted to the second client device 616*b*. In this manner, the processing device 660 processes (e.g., filters and formulates) the notifications 626 received from the monitoring device 630.

The embodiment shown in FIG. 6 is merely illustrative. Of course, in one embodiment, the foregoing procedures could be realized without a processing device 660, if the monitoring device 630 and/or client devices 616 include instructions for performing these procedures. It should be noted that the disclosed systems and procedures may be implemented in connection with many client devices 616, processing devices 660, and/or monitoring devices 630.

Figure 7:
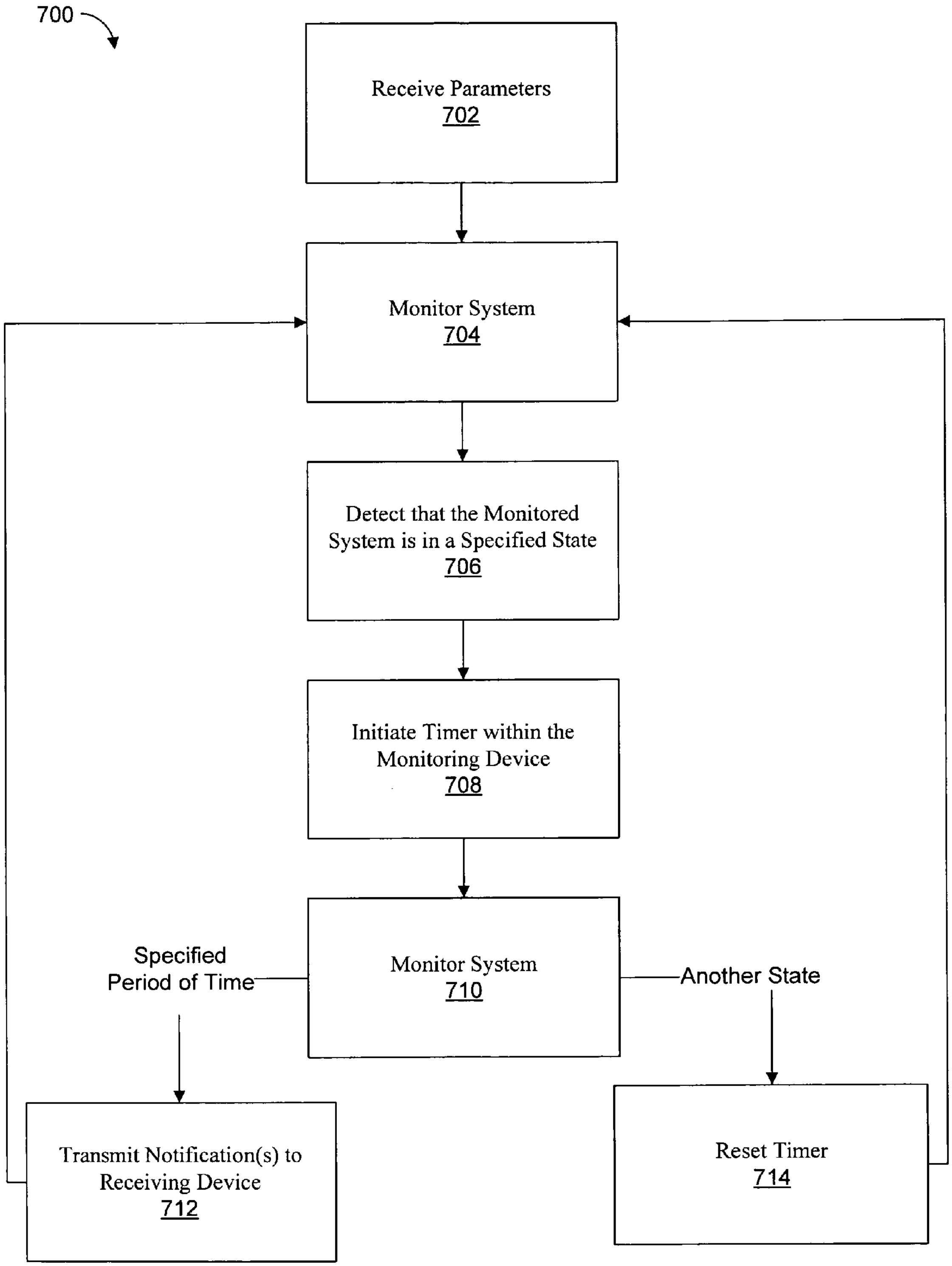
FIG. 7 is a flow diagram that illustrates a method for providing notification when a state of a monitored system persists for a specified period of time.

FIG. 7 is a flow diagram that illustrates a method 700 for providing notification when a state of a monitored system 240 persists for a specified period of time. Parameters 646 are received 702 that define when notification 626 should be transmitted to a client device 616. The parameters may include a single criterion or multiple criteria. Thereafter, a monitoring device 630 monitors 704 a monitored system in accordance with the parameters. It is detected 706 that the monitored system is in the specified state. A timer is initiated 708 within the monitoring device. Thereafter, the monitoring device continues to monitor 710 the monitored system to determine whether the monitored system remains in the specified state.

If the monitored system remains in the specified state for the period of time specified by the parameters, notification is transmitted 712 to the client device. In one embodiment, the notification is processed or routed by a processing device 660 before transmission to the client device. If the monitored device changes to a state other than the specified state before the specified period of time has passed, the timer is reset 714 and monitoring 704 of the monitored system commences again.

The foregoing method 700 may be implemented in connection with a wide variety of different configurations. For example, this method 700 may be implemented in connection with a monitoring device that is integrated or not integrated with the monitored system, as illustrated in FIGS. 2 and 4. It may be implemented in connection with multiple client devices, networks, and/or processing devices, as illustrated in FIGS. 5-6.

The disclosed method 700 minimizes network traffic and minimizes the effect that disruptions in network communications may have on a monitoring system. For example, the foregoing method 700 does not, in all cases, require a centralized monitoring system to periodically poll each device to determine the state of the monitored system or require a monitoring device to notify the centralized monitoring system of each change in state of the monitored system. Such centralized systems would create many potential problems. For example, if such a centralized system monitors whether a front door has been open for a specified period of time, the following problems could be created:

There is no guarantee that every event sent signal from a remote device that monitors the door reaches the centralized computer. If the network fails between the time the door is opened and closed, the monitoring computer may incorrectly determine that the door remained in the "open" state during this period;

Because there is no guarantee that every signal sent from a remote device reaches the centralized monitoring system, there is no guarantee that an event actually persisted. In the noted example, if the network goes down for an hour, and the door is opened and closed many times during that time, the monitoring computer will incorrectly determine that the door has remained in a persistent state throughout the hour;

The monitoring computer can crash or be brought down for maintenance, etc. The centralized system scenarios described above would require the monitoring computer to remember past states of devices. Unless the state of every device is stored in nonvolatile memory, rather than RAM, these past states would be lost and the monitoring system would fail; and Finally, more bandwidth and other computing resources are consumed by centralized systems that utilize remote polling or receive periodic updates from a remote device than if each individual remote device tracks persistent states of the monitored system.

Figure 8:
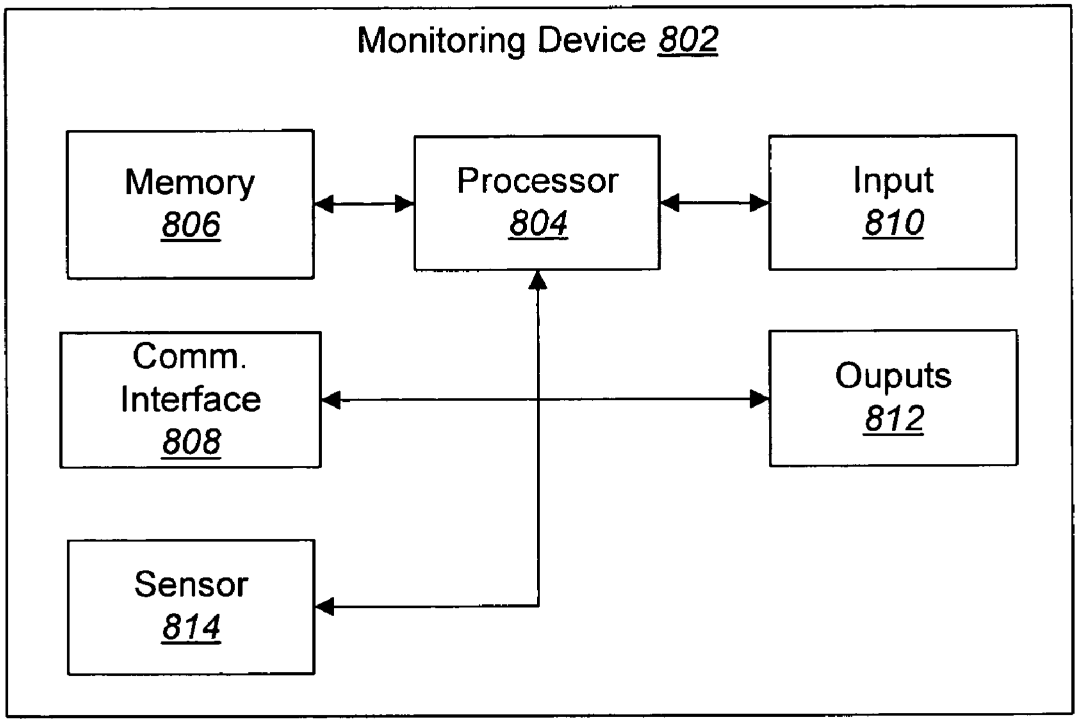
FIG. 8 is a block diagram illustrating the major hardware components typically utilized with embodiments of a monitoring device.

FIG. 8 is a block diagram illustrating the major hardware components typically utilized with embodiments of a monitoring device 802. A monitoring device 802 typically includes a processor 804 in electronic communication with various components of the monitoring device 802. The processor 804 controls the operation of the monitoring device 802 and may be embodied as a microprocessor, a microcontroller, a digital signal processor (DSP), or other device known in the art. The processor 804 typically performs logical and arithmetic operations based on program instructions stored within the memory 806.

The processor 804 may also be in electronic communication with a communication interface 808. The communication interface 808 may be used for communications with external computing devices, servers, embedded devices, device controllers, storage devices, etc. Thus, the communication interface 808 of the monitoring device 802 may be designed to send or receive signals from other devices. The communication interface 808 may be based on wired communication technology, wireless communication technology, or both. Examples of different types of communication interfaces 808 include a serial port, a parallel port, USB, an Ethernet adapter, an IEEE 1394 bus interface, a small computer system (SCSI) bus interface, an infrared (IRDA) communication port, a Bluetooth wireless communication adapter, and so forth.

The processor 804 may, in one embodiment, operably be connected to various input 810 and/or output 812 devices capable of electronic communication with the processor 804, or, in other words, with devices capable of input and/or output in the form of an electrical signal. Examples of different kinds of input devices 810 include a keypad, mouse, microphone, remote control device, button, trackball, touchpad, touch screen, lightpen, etc. Examples of different kinds of output devices 810 include an LCD screen (for displaying the status or selected features of the monitoring device 802) and an audio speaker.

The monitoring device 802 may also include memory 806. The memory 806 may be a separate component from the processor 804, or it may be on-board memory 806 integrated with the processor 804. For example, microcontrollers often include a certain amount of on-board memory. As used herein, the term "memory" 806 is broadly defined as any electronic storage medium, such as read-only memory (ROM), random access memory (RAM), magnetic disk storage media, optical storage media, flash memory devices, on-board memory included with the processor 804, EPROM memory, EEPROM memory, registers, etc. The memory 806 typically stores program instructions and other types of data. The program instructions may be executed by the processor 804 to implement some or all of the methods disclosed herein. The memory 806 may also be used, for example, to store device style sheets.

The monitoring device 802 made also include a sensor 814. The sensor 814 may be embodied in a number of different ways to determine whether the monitored system is in the specified state. The sensor 814 may include, for example, an electrical sensor, optical sensor, tactile sensor, and/or a chemical sensor.

In one embodiment, the monitoring device 802 is an embedded device. An embedded device stores much, if not all, of its programming code in read-only memory. An embedded device is not a general purpose computer, but generally performs a specific purpose, such as transmitting control signals to ambiance devices. In an alternative embodiment, the monitoring device may comprise a desktop computer, server, notebook or laptop computer, tablet PC, personal data assistant (PDA) or other type of computing device. The client device and processing device may also include similar components, excepting the sensor 814.

Figure 9:
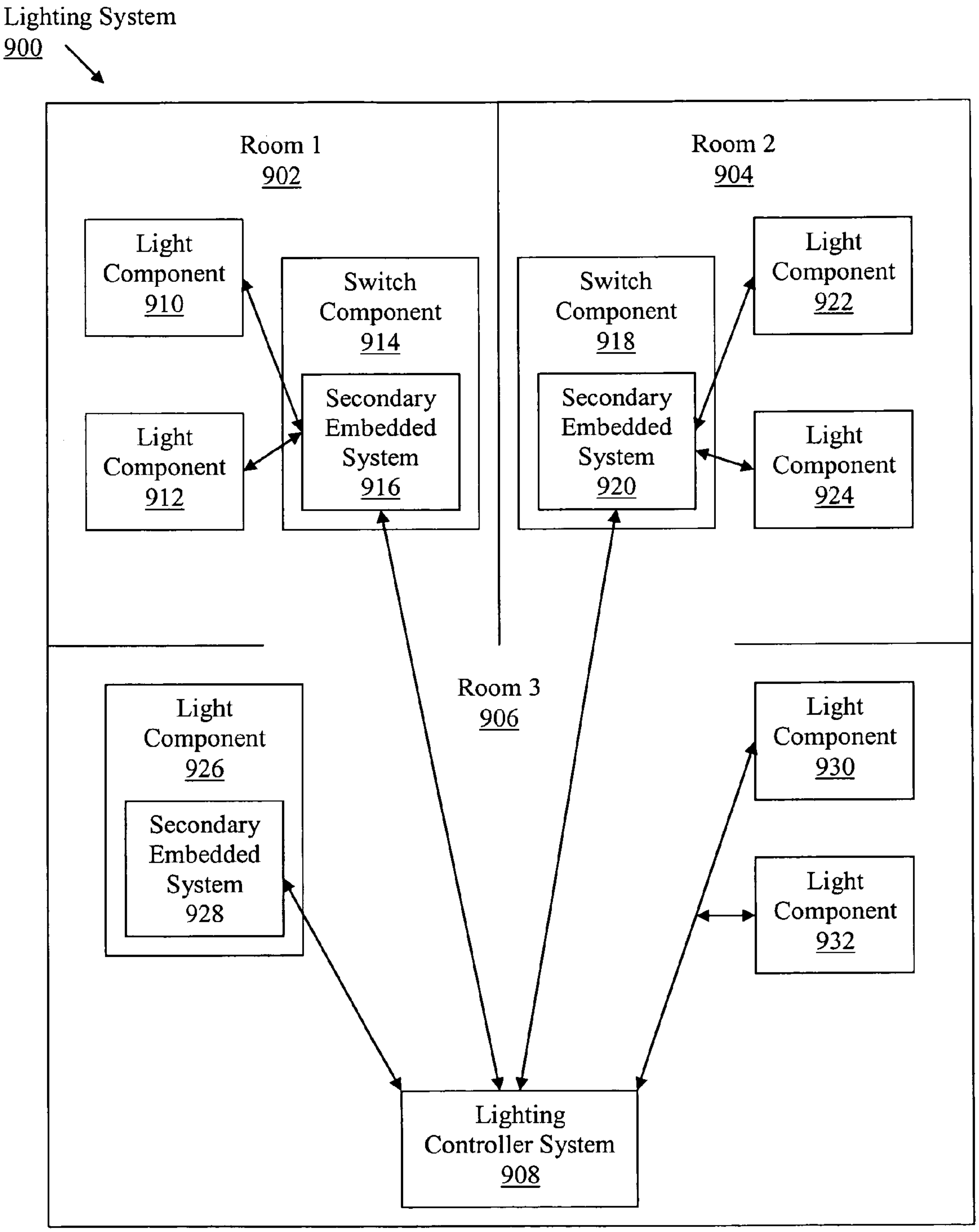
FIG. 9 is a block diagram illustrating a lighting system that may be utilized in connection with the persistent state notification systems and methods disclosed herein.
Figure 10:
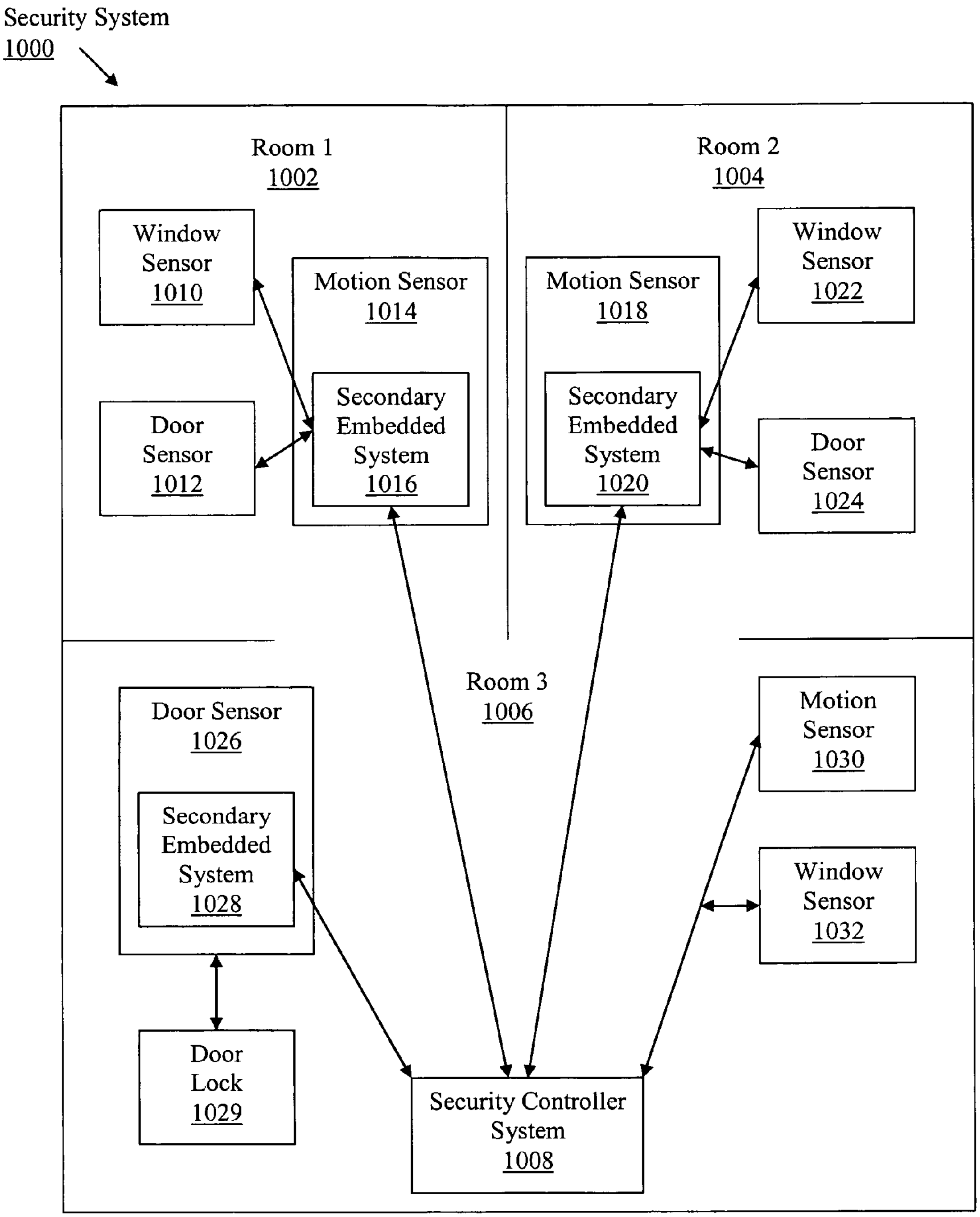
FIG. 10 is a block diagram illustrating a security system that may be utilized in connection with the persistent state notification systems and methods disclosed herein.
Figure 11:
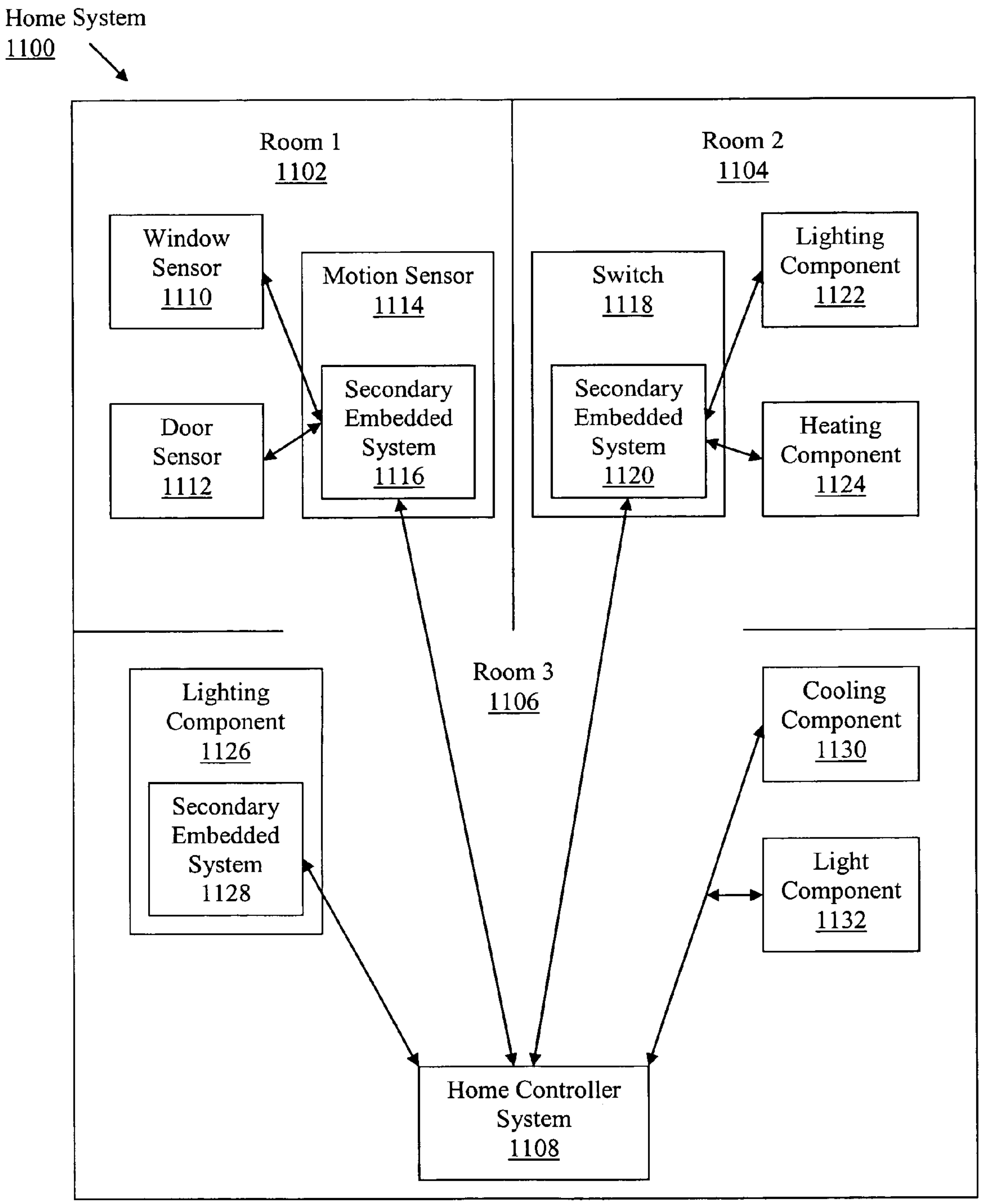
FIG. 11 is a block diagram illustrating a home system that may be utilized in connection with the disclosed persistent state notification systems and methods.

The present systems and methods may be used in several contexts. For example, persistent state notification systems may be utilized in connection with various control systems, which are illustrated in FIGS. 9-11. The monitoring systems and control systems may utilize the same network and many control devices may also perform monitoring functions. Furthermore, in response to a notification, a user may employ a control system to remedy some problems for which notification is provided. For example, utilizing the notification system, a user may learn that a television set has been on for a period of time with no one watching it. Then, utilizing the control system, the user may remotely turn off the television set.

FIG. 9 illustrates one embodiment of a system 900 wherein these systems and methods may be implemented. In particular, FIG. 9 is a block diagram that illustrates one embodiment of a lighting system 900 that includes a lighting controller system 908. The lighting system 900 of FIG. 9 may be incorporated, for example, into various rooms within a home. As illustrated, the system 900 includes a room 1 902, a room 2 904, and a room 3 906. This system 900 may be implemented in any number and variety of rooms within a home, dwelling, building, or other environment.

The lighting controller system 908 may monitor and control additional embedded systems and components within the system 900. In one embodiment, room 1 902 and the room 2 904 each include a switch component 914, 918. The switch components 914, 918 may also include a secondary embedded system 916, 920. The secondary embedded systems 916, 920 may receive instructions from the central lighting controller system 908. The secondary embedded systems 916, 920 may then execute these instructions. The instructions may include powering up or powering down various light components 910, 912, 922, and 924. The instructions may also include dimming or increasing the brightness of the various light components 910, 912, 922, and 924. The instructions may further include arranging the brightness of the light components 910, 912, 922, and 924 in various patterns. The secondary embedded systems 916, 920 may also facilitate monitoring and controlling each light component 910, 912, 922, and 924 through the central embedded system 908.

The lighting controller system 908 might also provide instructions directly to a light component 926 that includes a secondary embedded system 928 in room 3 906. The central embedded system 908 may, for example, instruct the secondary embedded system 928 to power down or power up the individual light component 926. Similarly, the instructions received from the central embedded system 908 may include dimming or increasing the brightness of the individual light component 926. The lighting controller system 908 may also monitor and provide instructions directly to individual light components 930, 932 within the system 900.

FIG. 10 illustrates an additional embodiment of a system wherein the present systems and methods of the present invention may be implemented. In particular, FIG. 10 is a block diagram illustrating a security system 1000. As with the lighting system, the security system 1000, in the depicted embodiment, is implemented in a room 1 1002, a room 2 1004, and a room 3 1006. These rooms may be in the confines of a home or other enclosed environment. The system 1000 may also be implemented in an unenclosed environment where the rooms 1, 2 and 3, 1002, 1004, 1006 represent territories or boundaries.

The system 1000 includes a security controller system 1008. The security controller system 1008 monitors and receives information from the various components within the system 1000. For example, motion sensors 1014, 1018 in rooms 1 and 2 1002, 1004 may each include a secondary embedded system 1016, 1020. The motion sensors 1014, 1018 may monitor an area for motion and alert the security controller system 1008 when motion is detected via the secondary embedded systems 1016, 1020. The security controller system 1008 may also provide instructions to the various components within the system 1000. For example, the security controller system 1008 may provide instructions to the secondary embedded systems 1016, 1020 to power up or power down a window sensor 1010, 1022 or a door sensor 1012, 1024. In one embodiment, the secondary embedded systems 1016, 1020 notify the security controller system 1008 when the window sensors 1010, 1022 detect movement of a window. Similarly, the secondary embedded systems 1016, 1020 notify the security controller system 1008 when the door sensors 1012, 1024 detect movement of a door.

The security controller system 1008 may also monitor and provide instructions directly to individual components within the system 1000. For example, the security controller system

1008 may monitor and provide instructions to power up or power down a motion or window sensor 1030, 1032.

Each individual component comprising the system 1000 may also include a secondary embedded system. For example, FIG. 10 illustrates a door sensor 1026 including a secondary embedded system 1028. An electronic door lock 1029 is also shown. The security controller system 1008 may monitor and provide instructions to the secondary embedded system 1028 as similarly described above.

FIG. 11 is a block diagram illustrating one embodiment of a home system 1100. The home system 1100 includes a home controller system 1108 that facilitates the monitoring of various systems, such as the lighting system 900, the security system 1000, and the like. The home system 1100 allows a user to control various components and systems through one or more embedded devices. In one embodiment, the home controller system 1108 monitors and provides information in the same manner as previously described in relation to FIGS. 9 and 10. In the depicted embodiment, the home controller system 1108 provides instructions to a heating component 1124 via a secondary embedded system 1120. The heating component 1124 may include a furnace or other heating device typically found in resident locations or offices. The home controller system 1108 may provide instructions to power up or power down the heating component 1124 via the secondary embedded system 1120.

Similarly, the home controller system 1108 may monitor and provide instructions directly to a component within the home system 1100, such as a cooling component 1130. The cooling component 1130 may include an air conditioner or other cooling device typically found in resident locations or offices. The home controller system 1108 may instruct the cooling component 1130 to power up or down depending on the temperature reading collected by the home controller system 1108. The home system 1100 functions in a similar manner as previously described in relation to FIGS. 9 and 10.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for providing notification when a state of a monitored system persists for a specified period of time, the method comprising:

detecting that a monitored system is in a specified state utilizing a monitoring device, wherein the monitoring device comprises an embedded device, wherein the embedded device is not a general purpose computer, and wherein the monitored system is incapable of transmitting or monitoring its own state;

initiating a timer within the monitoring device in response to detecting that the monitored system is in the specified state;

monitoring the monitored system, utilizing the monitoring device, to determine whether the monitored system remains in the specified state; and if the monitored system remains in the specified state for a specified period of time, transmitting notification that the monitored system remained in the specified state for the specified period of time from the monitoring device to a client device via a network, wherein no notification is transmitted in response to detecting that the monitored system is in the specified state until after it is determined that the monitored system has remained in the specified state for the specified period of time.

2. The method of claim 1, wherein if, after initiating the timer, the monitored system changes to a state other than the specified state before the specified period of time passes, the timer is reset.

3. The method of claim 1, wherein the specified state requires that more than one criterion be satisfied.

4. The method of claim 1, further comprising receiving parameters at the monitoring device to define the specified state of the monitored system and the specified period of time.

5. The method of claim 1, further comprising processing the notification by a processing device before the notification is transmitted to the client device.

6. The method of claim 5, further comprising processing a second notification by the processing device, wherein the second notification was transmitted to the processing device by a second monitoring device.

7. The method of claim 5, further comprising transmitting a second notification from the processing device to a second client device in response to receipt of parameters from the second client device, wherein the second notification was transmitted to the processing device by the monitoring device.

8. The method of claim 5, further comprising processing the notification at the processing device and transmitting the notification to a second client device.

9. The method of claim 1, wherein the monitored system and the monitoring device comprise an integrated device.

10. The method of claim 1, wherein the timer is initiated and begins to run before any notification is sent.

11. A system that is configured for providing notification when a state of a monitored system persists for a specified period of time, the system comprising:

a monitoring device having a processor and memory in electronic communication with each other, wherein the monitoring device comprises an embedded device, wherein the embedded device is not a general purpose computer, and wherein the monitored system is incapable of transmitting or monitoring its own state; and instructions stored in the memory of the monitoring device, the instructions being executable to:

detect that a monitored system is in a specified state utilizing the monitoring device;

initiate a timer within the monitoring device in response to detecting that the monitored system is in the specified state;

monitor the monitored system, utilizing the monitoring device, to determine whether the monitored system remains in the specified state; and if the monitored system remains in the specified state for a specified period of time, transmit notification that the monitored system remained in the specified state for the specified period of time from the monitoring device to a client device via a network, wherein no notification is transmitted in response to detecting that the monitored system is in the specified state until after it is determined that the monitored system has remained in the specified state for the specified period of time.

12. The system of claim 11, wherein the instructions are further executable to process the notification by a processing device before the notification is transmitted to the client device.

13. The system of claim 12, wherein the instructions are further executable to process a second notification by the processing device, wherein the second notification was transmitted to the processing device by a second monitoring device.

14. The system of claim 12, wherein the instructions are further executable to transmit a second notification from the processing device to a second client device in response to receipt of parameters from the second client device, wherein the second notification was transmitted to the processing device by the monitoring device.

15. The system of claim 12, wherein the instructions are further executable to process the notification at the processing device and transmit the notification to a second client device.

16. A computer-readable medium comprising executable instructions for providing notification when a state of a monitored system persists for a specified period of time, the instructions being executable to:

detect that a monitored system is in a specified state utilizing a monitoring device, wherein the monitoring device comprises an embedded device, wherein the embedded device is not a general purpose computer, and wherein the monitored system is incapable of transmitting or monitoring its own state;

initiate a timer within the monitoring device in response to detecting that the monitored system is in the specified state;

monitor the monitored system, utilizing the monitoring device, to determine whether the monitored system remains in the specified state; and if the monitored system remains in the specified state for a specified period of time, transmit notification that the monitored system remained in the specified state for the specified period of time from the monitoring device to a client device via a network, wherein no notification is transmitted in response to detecting that the monitored system is in the specified state until after it is determined that the monitored system has remained in the specified state for the specified period of time.

17. The computer-readable medium of claim 16, wherein the instructions are further executable to process the notification by a processing device before the notification is transmitted to the client device.

18. The computer-readable medium of claim 17, wherein the instructions are further executable to process a second notification by the processing device, wherein the second notification was transmitted to the processing device by a second monitoring device.

* * * * *

UNITED STATES PATENT AND TRADEMARK OFFICE

CERTIFICATE OF CORRECTION

PATENT NO. : 7,693,590 B2
APPLICATION NO. : 11/314806
DATED : April 6, 2010
INVENTOR(S) : Nelson It is certified that error appears in the above-identified patent and that said Letters Patent is hereby corrected as shown below:

In column 6, line 2 please delete “requesters” and replace it with --requestors--.

Signed and Sealed this

Ninth Day of November, 2010

David J. Kappos
*Director of the United States Patent and Trademark Office*